(12) United States Patent
Chagnon et al.

(10) Patent No.: US 9,623,722 B2
(45) Date of Patent: Apr. 18, 2017

(54) VENTILATION SYSTEM FOR A PASSENGER TRANSIT VEHICLE

(75) Inventors: Marc Chagnon, Boucherville (CA); Jacques Langlois, La Pocatiere (CA); Jenny Marsala, St-Leonard (CA); René Beaulleu, Ste-Julie (CA)

(73) Assignee: Bombardier Transportation GmbH, Berlin (DE)

( * ) Notice: Subject to any disclaimer, the term of this patent is extended or adjusted under 35 U.S.C. 154(b) by 785 days.

(21) Appl. No.: 13/983,691

(22) PCT Filed: Feb. 3, 2012

(86) PCT No.: PCT/CA2012/000104
§ 371 (c)(1),
(2), (4) Date: Nov. 20, 2013

(87) PCT Pub. No.: WO2012/103641
PCT Pub. Date: Aug. 9, 2012

(65) Prior Publication Data
US 2014/0295746 A1  Oct. 2, 2014

Related U.S. Application Data

(60) Provisional application No. 61/439,717, filed on Feb. 4, 2011.

(51) Int. Cl.
*B60H 1/00* (2006.01)
*B60H 1/24* (2006.01)
(Continued)

(52) U.S. Cl.
CPC ..... *B60H 1/00828* (2013.01); *B60H 1/00371* (2013.01); *B60H 1/00735* (2013.01);
(Continued)

(58) Field of Classification Search
CPC .................................................. B60H 1/00371
(Continued)

(56) References Cited

U.S. PATENT DOCUMENTS 2,383,423 A * 8/1945 Steins ................ B60H 1/00371
454/158
2,476,368 A * 7/1949 Guernsey ........... B60H 1/00371
454/105

(Continued)

Primary Examiner — Steven B McAllister
Assistant Examiner — Jonathan Cotov
(74) Attorney, Agent, or Firm — The Webb Law Firm

(57) ABSTRACT

A ventilation system for a passenger transit vehicle that comprises a passenger compartment. The ventilation system comprises a variable speed fan for providing outside air to the passenger compartment, wherein within a given ambient temperature range, the speed of the variable speed fan is controlled such that the air speed produced by the variable speed fan increases with increasing ambient temperature. The ventilation system further comprises a duct system fluidly connecting the variable speed fan to an air diffuser that directs the air from the variable speed fan towards the passengers within the passenger compartment. The cross sectional area of the duct system decreases along its length for providing substantially constant air pressure along its length. The ventilation system is able to provide outside air into the passenger compartment at an air flow speed of greater than 0.15 m/s.

36 Claims, 12 Drawing Sheets

(51) Int. Cl.
*B61D 17/12* (2006.01)
*B61D 17/18* (2006.01)
*B61D 27/00* (2006.01)
*B60H 1/26* (2006.01)

(52) U.S. Cl.
CPC ......... *B60H 1/00885* (2013.01); *B60H 1/245* (2013.01); *B60H 1/247* (2013.01); *B60H 1/262* (2013.01); *B61D 17/12* (2013.01); *B61D 17/18* (2013.01); *B61D 27/009* (2013.01)

(58) Field of Classification Search
USPC ..................................................... 454/75, 83
See application file for complete search history.

(56) References Cited

U.S. PATENT DOCUMENTS

| | | | | |
|---|---|---|---|---|
| 2,640,409 A * | 6/1953 | Hans | ................... | B60H 1/00371 165/124 |
| 2,923,223 A * | 2/1960 | Fall | ................... | B60H 1/00371 454/99 |
| 3,774,676 A * | 11/1973 | Franz | ................. | B60H 1/00814 165/204 |
| 3,862,549 A * | 1/1975 | Fernandes | .......... | B60H 1/00371 165/42 |
| 4,408,713 A * | 10/1983 | Iijima | ................ | B60H 1/00828 165/202 |
| 4,888,959 A * | 12/1989 | Brown | ............... | B60H 1/00371 62/244 |
| 5,001,905 A * | 3/1991 | Miyazaki | ........... | B60H 1/00371 454/161 |
| 5,421,776 A * | 6/1995 | Sakamoto | ............... | F24F 13/06 454/32 |
| 5,547,125 A * | 8/1996 | Hennessee | ......... | B60H 1/00735 236/49.3 |
| 5,647,793 A * | 7/1997 | Mariaux | ............ | B60H 1/00371 454/103 |
| 5,779,536 A | 7/1998 | McCorkel et al. | | |
| 6,357,256 B1 * | 3/2002 | Mallek | ............... | B60H 1/00371 62/507 |
| 6,745,587 B1 * | 6/2004 | Hille | ................... | B60H 1/00371 62/244 |
| 6,763,669 B1 * | 7/2004 | Bushnell | ............ | B60H 1/00371 62/115 |
| 7,051,544 B2 * | 5/2006 | Hille | ................... | B60H 1/00371 62/244 |
| 8,506,367 B2 * | 8/2013 | Cermak | ............. | B60H 1/00371 454/152 |
| 2003/0060154 A1 | 3/2003 | Colinet | | |
| 2003/0173056 A1 * | 9/2003 | McCauley | ......... | B60H 1/00371 165/42 |
| 2004/0093883 A1 * | 5/2004 | Nakagawa | ............. | B60H 1/247 62/244 |
| 2005/0230488 A1 * | 10/2005 | Markwart | .......... | B60H 1/00371 237/10 |
| 2008/0053129 A1 * | 3/2008 | Follette | ............. | B60H 1/00371 62/244 |
| 2008/0223548 A1 | 9/2008 | Treu | | |
| 2010/0120345 A1 * | 5/2010 | Ryan | ................... | B60H 1/00371 454/75 |
| 2011/0061414 A1 * | 3/2011 | McAllister, II | .... | B60H 1/00371 62/244 |
| 2012/0055180 A1 * | 3/2012 | Larson | ............... | B60H 1/00014 62/80 |
| 2013/0295832 A1 * | 11/2013 | Cermak | ............. | B60H 1/00371 454/108 |
| 2014/0335773 A1 * | 11/2014 | Takahashi | ......... | B61D 27/0018 454/108 |

\* cited by examiner

VENTILATION SYSTEM FOR A PASSENGER TRANSIT VEHICLE

CROSS REFERENCE TO RELATED APPLICATIONS

This application claims the benefit under 35 USC §119(e) of U.S. provisional patent application Ser. No. 61/439,717 filed on Feb. 4, 2011. The contents of the above-mentioned patent applications are incorporated herein by reference.

FIELD OF THE INVENTION

The present invention relates to the field of ventilation systems for passenger transit vehicles, and more particularly to ventilation systems that provide passenger comfort through the use of one or more variable speed fans that provide outside air to the interior of the passenger transit vehicle.

BACKGROUND OF THE INVENTION

Passenger comfort is an important consideration for any passenger transit vehicle. Much consideration is given to the suspension, the seating and the power delivery in order to ensure a smooth and comfortable ride for the passengers. However, when considering passenger comfort, another important criterion to take into consideration is the transit vehicle's ventilation system. Many transit vehicles operate in climates that can become quite hot in the summer time. When weather temperatures increase, transit vehicles can become hot, stuffy and suffocating, which can greatly detract from passenger comfort. This is particularly true during rush hours, when the passenger load within the transit vehicles is high.

In order to address the issue of passenger comfort when the weather gets hot, many public transit systems have installed air conditioning units into their transit vehicles. While air conditioning is effective at keeping temperatures within the transit vehicles comfortable, a deficiency with these systems is that they are expensive to purchase and to operate.

Other known ventilation systems that are used in transit vehicles operate with large axial fans in the ceiling that direct air from outside the transit vehicle into the passenger compartment of the transit vehicle. A deficiency with these ventilation systems is that they generally concentrate the supply of air in a given location, such that not all the passengers benefit from the farming effect. A further deficiency with these existing ventilation systems is that the fan's ability to move air decreases as the vehicle accelerates. Furthermore they do not adjust dynamically to increasing passenger discomfort.

In light of the above, it can be seen that there is a need in the industry for an improved ventilation system for passenger transit vehicles that is able to alleviate, at least in part, the deficiencies of existing systems.

SUMMARY OF THE INVENTION

In accordance with a first broad aspect, the present invention provides a ventilation system for a passenger transit vehicle that comprises a passenger compartment. The ventilation system comprises a variable speed fan for drawing outside air from an air intake located on an exterior surface of the passenger transit vehicle and providing the outside air to the passenger compartment. The speed of the variable speed fan is controlled at least in part as a function of ambient temperature, wherein within a given ambient temperature range, the speed of the variable speed fan is controlled such that the air flow produced by the variable speed fan increases with increasing ambient temperature. The ventilation system further comprises an air diffuser positioned within an upper portion of the passenger compartment, the air diffuser comprising a plurality of air outlets directed into the passenger compartment for directing air from the variable speed fan towards passengers that travel within the transit vehicle. The ventilation system further comprises a duct system fluidly connecting the variable speed fan and the air diffuser. The duct system has a length and a cross sectional area, wherein the cross sectional area decreases along the length of the duct system for providing substantially constant air pressure along the length of the duct system.

In accordance with a second broad aspect, the present invention provides a ventilation system for a passenger transit vehicle comprising a passenger compartment. The ventilation system comprises an air input system positioned within an upper portion of the passenger compartment for providing outside air into the passenger compartment of the passenger transit vehicle. The air input system has at least one air intake located on an exterior surface of the passenger transit vehicle. The outside air is linearly diffused in a direction towards passengers that travel within the passenger compartment, wherein the air input system is operative for providing outside air into the passenger compartment at an air flow speed of greater than 0.15 m/s. The ventilation system further comprises an exhaust system for venting air from the passenger compartment at a rate at least equivalent to the rate at which the air input system provides air flow into the passenger compartment so as to avoid over-pressurization of the passenger compartment.

In accordance with a third broad aspect, the present invention provides a ventilation system for a passenger transit vehicle that comprises a passenger compartment. The ventilation system comprises a variable speed fan for drawing outside air from an air intake located on an exterior surface of the passenger transit vehicle and providing the outside air to the passenger compartment. The speed of the variable speed fan is controlled at least in part as a function of a combination of ambient temperature and passenger load. The ventilation system further comprises an air diffuser positioned within an upper portion of the passenger compartment, the air diffuser comprising a plurality of air outlets directed into the passenger compartment for directing air from the variable speed fan towards passengers that travel within the transit vehicle. Within a given ambient temperature range, the speed of the variable speed fan is controlled such that the air speed that exits the air diffuser increases with at least one of increasing ambient temperature and increasing passenger load. The ventilation system further comprises a duct system fluidly connecting the variable speed fan and the air diffuser. The duct system has a length and a cross sectional area, wherein the cross sectional area decreases along the length of the duct system for providing substantially constant air pressure along the length of the duct system.

These and other aspects and features of the present invention will now become apparent to those of ordinary skill in the art upon review of the following description of specific embodiments of the invention and the accompanying drawings.

Other aspects and features of the present invention will become apparent to those ordinarily skilled in the art upon review of the following description of specific embodiments of the invention in conjunction with the accompanying figures.

DETAILED DESCRIPTION

Figure 1:
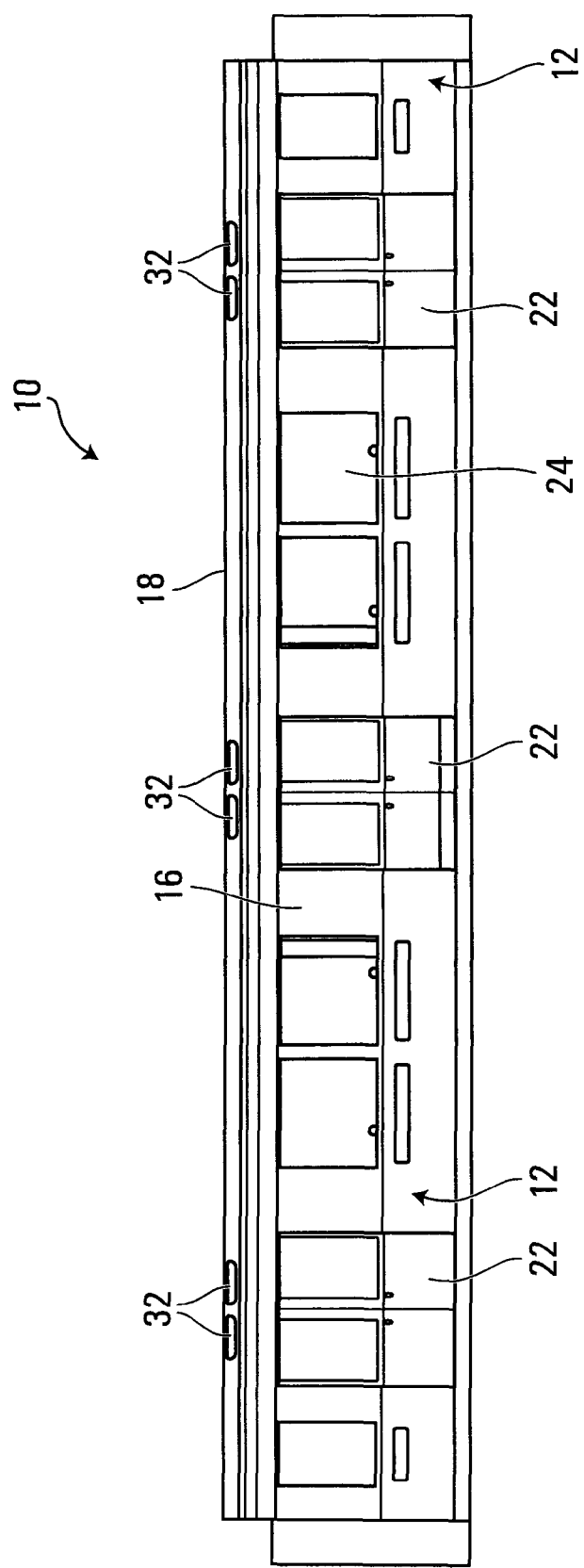
FIG. 1 shows a non-limiting front plan view of a passenger transit vehicle in which a ventilation system according to the present invention can be used.
Figure 2:
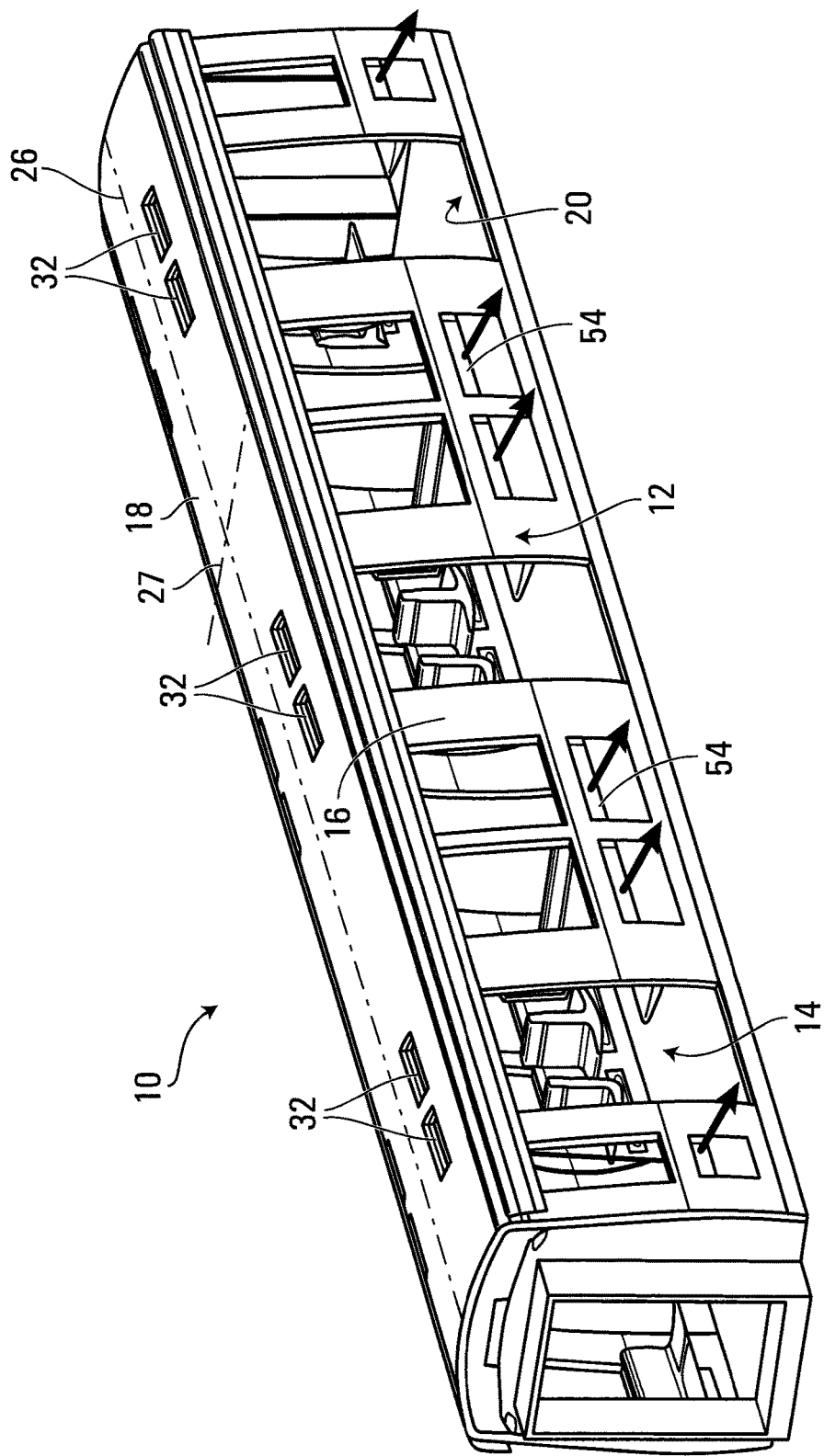
FIG. 2 shows a perspective view of the passenger transit vehicle of FIG. 1.

Shown in FIGS. 1 and 2 is a passenger transit vehicle 10 suitable for incorporating therein a ventilation system according to the present invention. In the non-limiting embodiment shown, the passenger transit vehicle 10 is in the form of a metro car. However, the ventilation system could be used in any type of passenger transit vehicle 10, such as an above-ground railway vehicle, a monorail car or a bus, among other possibilities. The ventilation system of the present invention is not limited to use within a specific type of passenger transit vehicle 10.

The passenger transit vehicle 10 shown in FIGS. 1 and 2 comprises an outer shell 12 that defines an interior passenger compartment 14 for receiving passengers. In the embodiment shown, the outer shell 12 comprises two side walls 16, a roof 18 and a floor 20. The two side walls 16 comprise doors 22 for allowing passengers to enter and exit the passenger compartment 14, and windows 24 for allowing the passengers to look outside the passenger compartment 14. The passenger transit vehicle 10 further comprises a longitudinal axis 26 that spans along the length of the passenger transit vehicle 10, and a transverse axis 27 that spans from one side wall 16 to the other side wall 16.

Figure 3:
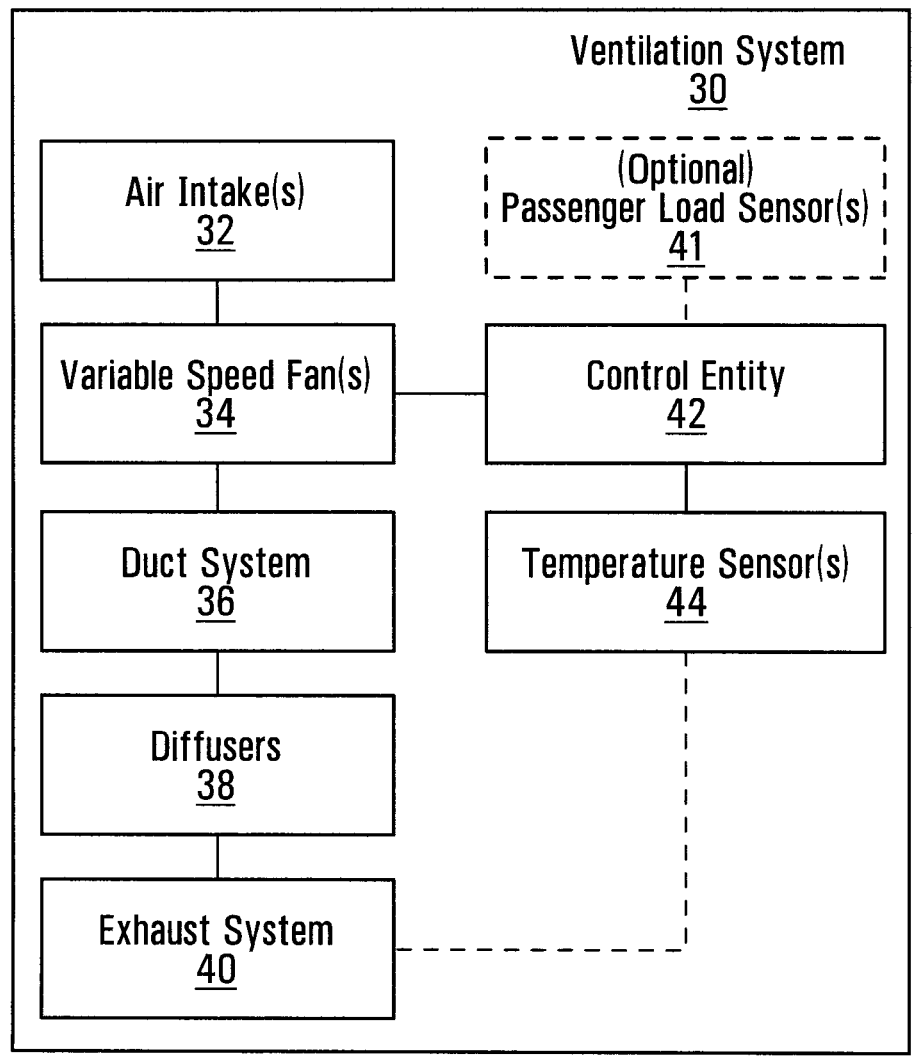
FIG. 3 shows a block diagram of a ventilation system according to a non-limiting example of implementation of the present invention.

Shown in FIG. 3 is a block diagram of a ventilation system 30 according to a non-limiting example of implementation of the present invention that is suitable for use within the passenger transit vehicle 10. As will be described in more detail below, the ventilation system 30 is operative for drawing outside air into the passenger compartment 14 at different air flow rates on a basis of ambient temperature, or on a basis of a combination of ambient temperature and the passenger load within the passenger compartment 14. The ambient temperature may be an ambient temperature outside the passenger compartment 14 or an ambient temperature within the passenger compartment 14.

In accordance with the present invention, the ventilation system 30 is operative for providing outside air that is un-processed into the passenger compartment 14. As used herein, the term "un-processed" means air that has not been subject to an air conditioning or heating unit. The un-processed air is taken directly from outside the passenger compartment 14 and directed into the passenger compartment 14 by one or more variable speed fans 34, without treating the outside air in order to change the temperature of the outside air in any significant way.

The ventilation system 30 comprises one or more air intake(s) 32 for receiving air from outside the passenger transit vehicle 10, one or more variable speed fan(s) 34 for drawing a desired volumetric rate of outside air into the passenger compartment 14, a duct system 36 for carrying the outside air from the variable speed fan(s) 34 substantially along the length of the passenger transit vehicle 10 and diffusers 38 for diffusing the outside air into the passenger compartment 14 at a desired air speed. The ventilation system 30 further comprises an exhaust system 40 for venting the air from within the passenger compartment 14 to outside the passenger transit vehicle 10. The exhaust system 40 vents the air from within the passenger compartment 14 at a rate that provides adequate pressurization within the passenger compartment 14. More specifically, the exhaust system 40 is operative for venting air from within the passenger compartment 14 at substantially the same rate as the outside air is being delivered into the passenger compartment 14, so as to avoid over-pressurization within the passenger compartment 14.

The ventilation system 30 further comprises at least one temperature sensor 44 for detecting the ambient air temperature and a control entity 42 in communication with the temperature sensor 44. Optionally, in the case where the control entity 42 is operative to control the air flow rate generated by the variable speed fan(s) 34 on a basis of a combination of ambient temperature and passenger load, the control entity 42 may also be in communication with a passenger load sensor 41 that determines the passenger load within the passenger compartment 14 at a given point in time.

It should be appreciated that there are a variety of different ways for the control entity 42 to determine the passenger load within the passenger compartment. For example, in accordance with a first non-limiting example, the control entity 42 may store data regarding the average passenger load at given times of the day within a memory unit (to be discussed later on). For example, based on historical data, the control entity 42 may know the expected passenger load at a given time of day for a particular day of the week, and can use this data in combination with ambient temperature in order to control the speed of the variable speed fan(s) 34.

In a second non-limiting example, the control entity 42 may be in communication with a passenger load sensor 41, as shown in FIG. 3, that may be a weight sensor that is connected to a suspension system of the passenger transit vehicle 10. In such a case, based on the detected weight of the passenger transit vehicle 10 (vs. an unloaded weight) by the sensor 41, the control entity can determine the passenger load within the vehicle.

In a further non-limiting example, the control entity 42 may be in communication with a vehicle control system of the passenger transit vehicle 10. The vehicle control system may be in wireless communication with an automated transit-pass system (such as the OPUS system in Montreal, or the Oyster system in London) that is able to detect the inflow and outflow rate of passengers into the transit system, such that the passenger load for the transit vehicle can be estimated based on the number of passengers within the transit system at any given time.

The control entity 42 is also in communication with one or more variable speed fan(s) 34 such that the speed of the variable speed fan(s) 34 can be controlled in order to control the rate of air flow being output by the variable speed fan(s) 34, and thus the speed of air that is provided to the passenger compartment 14 by the air diffusers 38. The configuration and functioning of each of the above components will be described in more detail below.

Air Intakes 32

As described above, the ventilation system 30 according to the present invention is operative for drawing air from outside the passenger transit vehicle 10 into the passenger compartment 14 for improving passenger comfort. The outside air is received into the ventilation system 30 via air intakes 32 located on an exterior surface of the passenger transit vehicle 10, as shown in FIG. 4A (in dotted lines) and FIG. 4B.

Figure 4A:
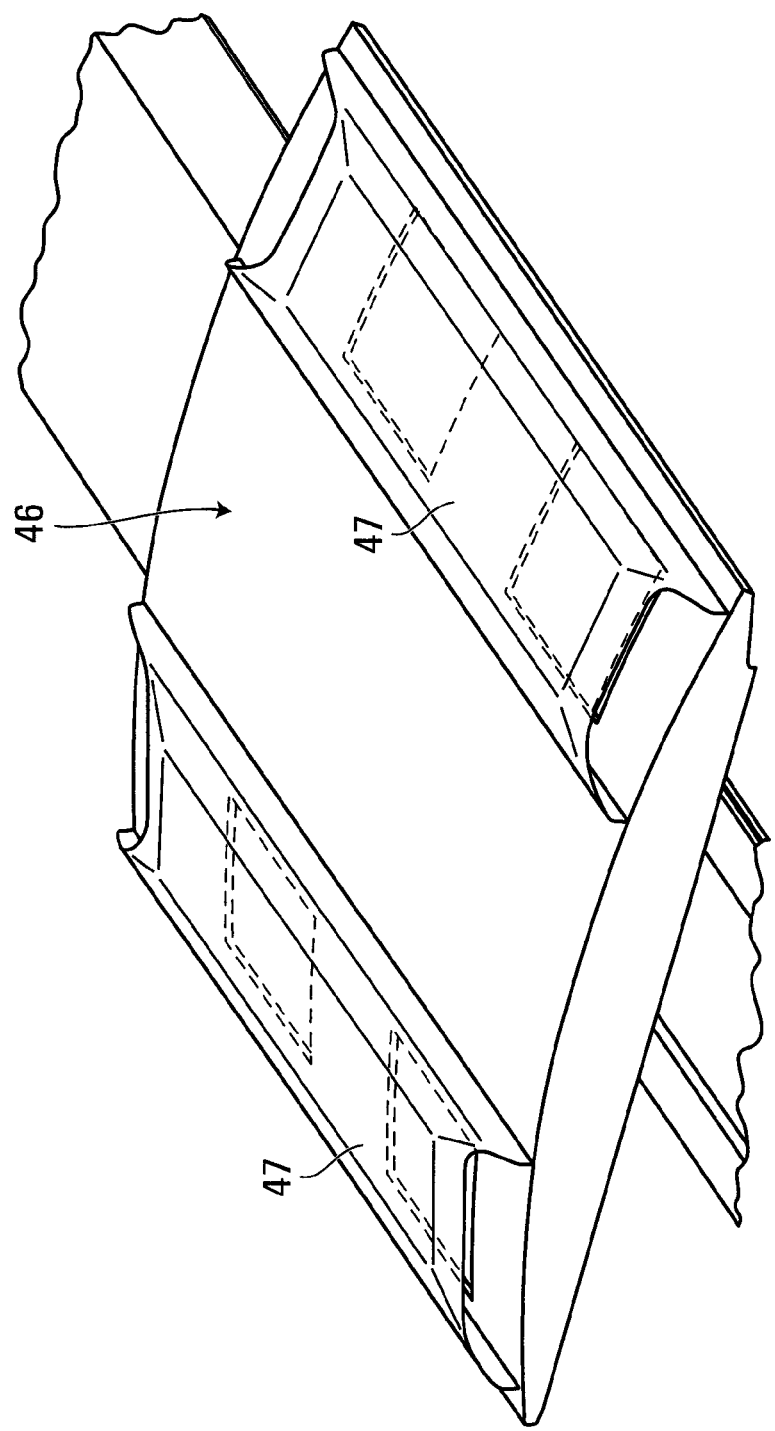
FIG. 4A shows a perspective view of an outside region of the passenger transit vehicle according to an optional embodiment, wherein the passenger transit vehicle comprises pressure stabilization devices covering air inlets.

In the non-limiting embodiment shown in FIG. 4A, an optional pressure stabilization device 47 is positioned over each air intake 32 (which is shown in dotted lines). As such, each air intake 32 is in fluid communication with a pressure stabilization device 47 that stabilizes the pressure of the outside air that enters the air intakes 32. The pressure stabilization devices 47 are located over the air intakes 32, on top of the roof 18 (or integrated into the roof 18) of the passenger transit vehicle 10 and comprise a scoop that provides an enclosure inlet. Alternatively, a NACA duct could be used.

The pressure stabilization devices 47 that are in communication with each air intake 32 are operative to stabilize the air pressure in those cases where air pressure is not stable by itself. Typically, the cross-section of the pressure stabilization devices 47 is smaller at its inlet and increases, thereby decreasing the speed of the air flow and increasing the air pressure of the air that enters the pressure stabilization devices 47. In certain circumstances, the pressure stabilization devices 47 use a reverse funnel technique that provides a narrow inlet followed by an expanding channel or funnel portion. Under Bernoulli's principle, as the outside air enters the inlet and flows into the expanding channel, the air speed decreases, such that the air pressure increases, thereby becoming more stable. Accordingly, these pressure stabilization devices 47 allow the outside air to reach a substantially steady air pressure and velocity, regardless of the varying speeds of travel of the passenger transit vehicle 10.

It should be appreciated that in certain circumstances, the pressure stabilization devices 47 are not necessary components of the ventilation system 30. For example, in the case where the passenger transit vehicle 10 has a smooth roof and operates in the open air at relatively slow speeds then it may not be necessary for the passenger transit vehicle 10 to have one or more pressure stabilization devices 47.

Figure 4B:
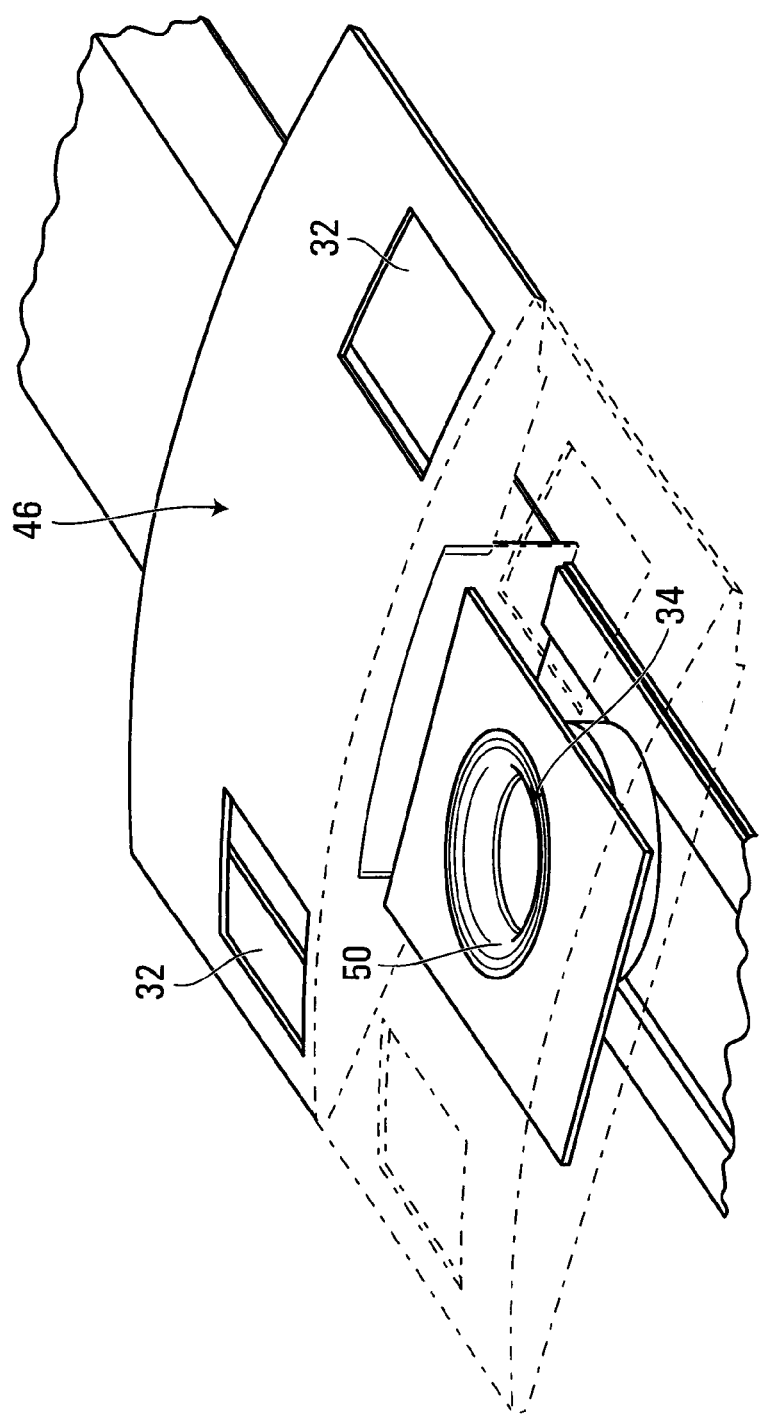
FIG. 4B shows a perspective view of the outside region of FIG. 4A without the pressure stabilization devices, such that two uncovered air intakes are shown, and two air intakes are shown in dotted lines such that a variable speed fan located there under can be seen.

Shown in FIG. 4b are a first pair of air intakes 32 without a pressure stabilization device 47, and a pair of air intakes 32 shown in dotted lines in order to reveal a variable speed fan 34 located there under. In accordance with a non-limiting embodiment, and as shown in FIGS. 2 and 4B, the air intakes 32 are located on the roof of the passenger transit vehicle 10. However, the air intakes 32 could be located on other portions of the exterior surface of the transit vehicle 10, without departing from the present invention. As indicated above, the air intakes 32 are operative for obtaining the outside air that is then fanned into the passenger compartment 14.

In general, the air inlets 32 lead directly into the plenum 46, which is used to build a volume of air around the fan intake 50 where the air is at a stable pressure. As shown in FIG. 4B, the air intakes 32 are not aligned with the fan intake 50 of the variable speed fans 34, thus creating a sort of a labyrinth so that water (such as rain) cannot easily reach the variable speed fans 34.

In the non-limiting embodiment shown in FIGS. 4A, 4B, the air intakes 32 are positioned in pairs with each pair of air intakes 32 having an air intake 32 on either side of the central longitudinal axis 26. However, the air intakes 32 may not be positioned in pairs, and may be positioned alone or in groups of three or more, instead. The air intakes 32 are positioned at various intervals along the length of the passenger transit vehicle 10. In the embodiment shown, two pairs of air intakes 32 are positioned in each vestibule region of the vehicle 10, meaning in the region above the doors 22 to the passenger compartment 14 where the passengers enter and exit the passenger transit vehicle 10. However, in alternative embodiments, the air intakes 32 can be located in other regions of the vehicle 10, depending on the particular shape and configuration of the passenger transit vehicle 10.

Variable Speed Fans 34

In the non-limiting embodiment shown in FIGS. 4A and 4B, each pair of air intakes 32 is associated with a respective variable speed fan 34. However, in alternative embodiments, each variable speed fan 34 may be associated with only one air intake 32, or with more than two air intakes 32, without departing from the present invention. In addition, in the non-limiting embodiment shown in FIGS. 2 and 5, the passenger transit vehicle 10 comprises 6 variable speed fans 34. However, a different number of variable speed fans 34 could also be included within the passenger transit vehicle 10 without departing from the present invention. The number of variable speed fans 34 included within the passenger transit vehicle 10 may vary depending on the length or volume of the passenger compartment 14.

In accordance with the present invention, each of the variable speed fans 34 may comprise a fan intake 50 (which is shown in the form of an intake cone), fan blades (not shown) and an electric motor (not shown) for causing the fan to rotate. Variable speed fans 34 are known in the art and as such will not be described in more detail herein.

In operation, the variable speed fans 34 receive the outside air directly from the one or more air intakes 32 or from the plenum 46, as described above. The outside air is received by the fan intakes 50 and is directed into the variable speed fans 34. The outside air received by the fan intakes 50 is preferable at a constant pressure and velocity. The variable speed fans 34 then provide the outside air to the passenger compartment 14, through the duct system 36 and diffusers 38, at a desired air flow speed. The desired air flow speed will be determined at least in part on a basis of an ambient air temperature, and will be achieved by controlling the speed of the variable speed fan 34. Accordingly, and as shown in FIG. 3, the variable speed fans 34 are in communication with a control entity 42 that is responsible for controlling the speed of the variable speed fans 34 for causing the variable speed fans 34 to provide a desired rate of air flow.

In accordance with the present invention, the control entity 42 (or control entities 42) control the speed at which the variable speed fans 34 operate at least in part on a basis of an ambient air temperature. The ambient air temperature may be the temperature within the passenger compartment 14 or the temperature of the outside air. As indicated above, the control entity 42 may also control the speed at which the variable speed fans 34 operate on a basis of a combination of passenger load and ambient temperature. In either case, the speed of the variable speed fans 34 is controlled such that the rate of air flow produced by the variable speed fans 34 increases with increasing ambient air temperature and/or increasing passenger load. As such, the air speed that exits the diffusers 38 is caused to increase, which has been found to help facilitate passenger comfort in hot weather conditions, or as the passenger load within the passenger vehicle 10 increases. For a given ambient temperature range, as the temperature within the passenger compartment 14 increases, the speed of the variable speed fans 34 is adjusted such that the speed of air flow entering the passenger compartment 14 also increases.

In accordance with a non-limiting embodiment, the speed of the variable speed fans 34 is increased or decreased dynamically and continuously as the ambient air temperature changes. In other words, the speed of the variable speed fans 34 is not adjusted in steps or increments, but instead is controlled in a continuous manner, with an infinite number of possible speeds as the ambient air temperature changes. In an alternative embodiment, the speed of the variable speed fans 34 may be controlled according to an incremental, step-function as the temperature changes.

The functionality and operation of the control entity 42, or control entities 42, that control the speed of the variable speed fans 34 will be described in more detail below.

Duct System 36

The ventilation system 30 according to the present invention further comprises a duct system 36. In accordance with the non-limiting embodiment shown in FIG. 5, each variable speed fan 34 is in fluid communication with a respective transfer duct 36a-f of the duct system 36. Each transfer duct 36a-f is operative for transferring the fanned air from an associated one of the variable speed fans 34 to one or more air diffusers 38, such that the fanned air enters the passenger compartment 14.

Figure 5:
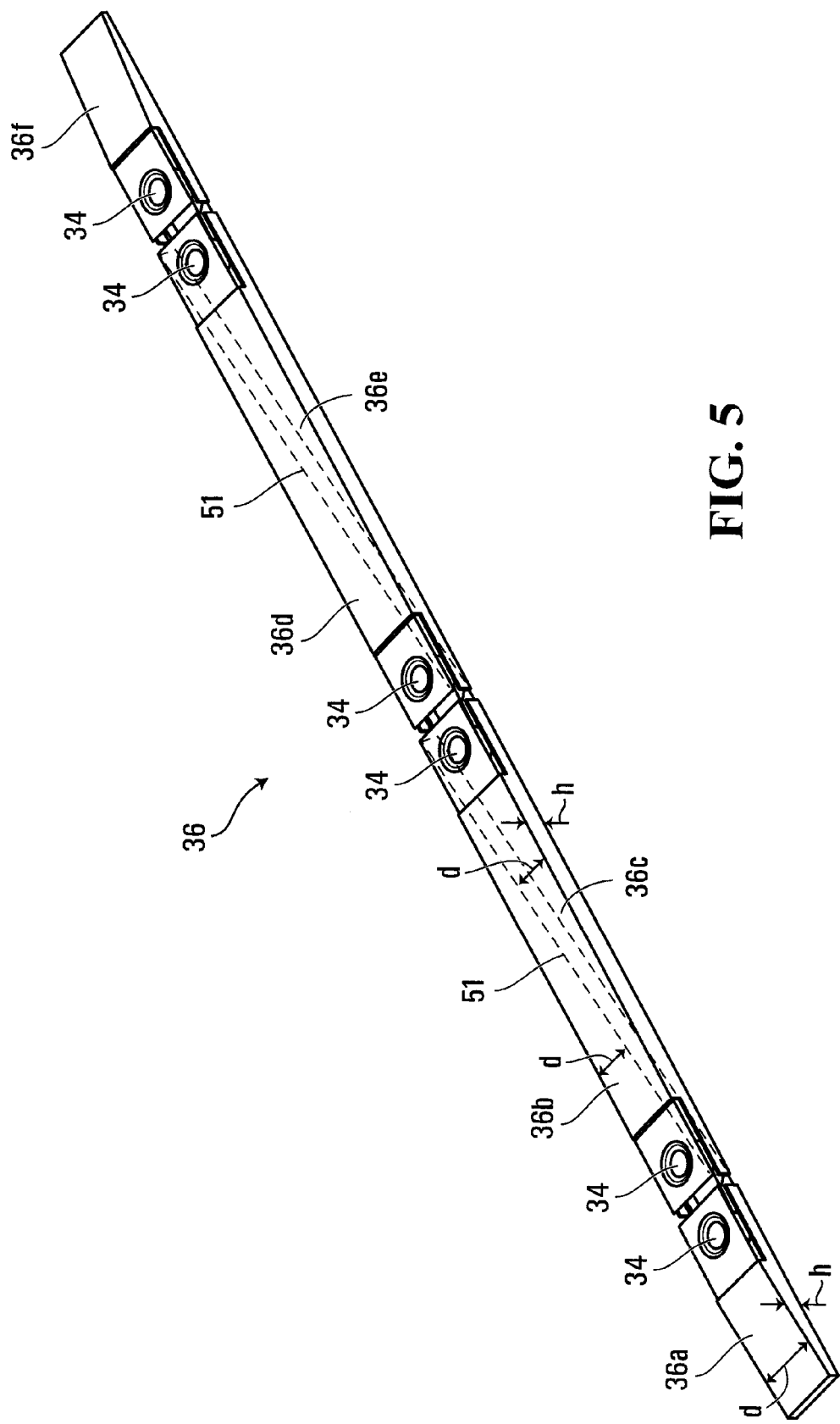
FIG. 5 shows a top perspective view of a duct system of the ventilation system according to a non-limiting example of implementation of the present invention.

In accordance with the present invention, the duct system 36 extends substantially along the entire length of the passenger transit vehicle 10, and runs parallel to the central longitudinal axis 26 of the passenger transit vehicle 10. In a non-limiting embodiment, the duct system 36 is centered along the central longitudinal axis 26 of the passenger transit vehicle 10. As shown in FIG. 5, each respective transfer duct 36a-f of the duct system 36 extends along a portion of the length of the passenger transit vehicle 10.

The length of each respective transfer duct 36a-f may be the same, or the length of one or more of the transfer ducts 36a-f may be different from the length of the other transfer ducts 36a-f. In the non-limiting example shown in FIG. 5, the transfer ducts 36b-e that are located within the middle portion of the passenger transit vehicle 10 each have a common length. However, the transfer ducts 36a and 36f located at the ends of the passenger transit vehicle 10 have a length "l" that is shorter than that of the transfer ducts 36b-e.

As shown in FIG. 5, the variable speed fans 34 are each located in proximity to an end portion of their respective transfer duct 36a-f. In order to maintain the air pressure within each transfer duct 36a-f relatively constant over its entire length, the cross sectional area of each transfer duct 36a-f decreases along its length in a direction moving away from its associated variable speed fan 34. By maintaining the air pressure over the entire length of the transfer ducts 36a-f substantially constant, the air velocity that exits the air diffusers 38 will remain substantially constant over the length of the transfer duct 36a-f.

The manner in which the cross-sectional areal of each transfer duct 36a-f decreases along its length may be different depending on the nature and construction of the transfer duct. For example, in the case of transfer ducts 36b and 36c, and 36d and 36e a single rectangular duct is positioned between two variable speed fans 34, such that there is a variable speed fan 34 at each end portion of the rectangular duct. A divider 51 is positioned within the interior of the duct for dividing the duct into the two separate transfer ducts 36b, 36c, and 36d, 36e. More specifically, the divider 51 is positioned diagonally between the two variable speed fans 34 such that each of the two variable speed fans 34 is separated from the transfer duct associated with the other variable speed fan 34. Given that the rectangular duct that spans between the two variable speed fans 34 has a substantially constant width and depth, by positioning the divider 46 substantially vertically between the top and bottom sides of the duct in a diagonal configuration, each of the transfer ducts 36b and 36c will have a constant height "h" along its length, but will have a decreasing depth "d" in a direction moving away from its associated variable speed fan 34. As such, the cross sectional area of each transfer duct 36b, 36c, 36d, 36ewill decrease in a direction moving away from its associated variable speed fan 34.

In the case of the transfer ducts 36a and 36f, these transfer ducts do not include a divider. Instead, in order to achieve the decreasing cross sectional area in a direction moving away from the variable speed fans 34, these two transfer ducts 36a and 36f have a depth "d" that remains constant along its length, but a height "h" that decreases along its length in a direction moving away from its associated variable speed fan 34. By decreasing the height "h" of the transfer ducts 36a and 36f in a direction away from the variable speed fans 34, the cross sectional area of each of these transfer ducts 36a, 36f will also decrease in a direction moving away from the variable speed fans 34.

As indicated above, by reducing the cross sectional area of each transfer duct 36a-f as the transfer duct extends farther away from its associated variable speed fan 34, the air pressure within the duct is maintained substantially constant. As a result, the airflow that exits the transfer duct will remain substantially constant along the length of the transfer duct.

It should be appreciated that the transfer ducts 36a-f may take on any shape and configuration without departing from the present invention, so long as the cross sectional area of each transfer duct decreases along its length. For example, the transfer ducts 36a-fcould be circular ducts or octagonal shaped ducts, that taper into a cone-like configuration, among other possibilities.

Air Diffusers 38

Each of the transfer ducts 36a-f of the duct system 36 is in fluid communication with one or more air diffusers 38 that are operative for diffusing the outside air into the passenger compartment 14 of the passenger transit vehicle 10. The air diffusers 38 are located in an upper region of the passenger compartments, such as in the ceiling 35 of the passenger compartment 14, or in an upper portion of the side walls of the passenger compartment 14, so as to be able to direct the outside air linearly downwards towards the passengers that are travelling in the passenger compartment 14. As used herein, the term "linearly downwards" refers to air that is directed outwards through linear outlets and is not fanned outwards via circulation fans.

Figure 6:
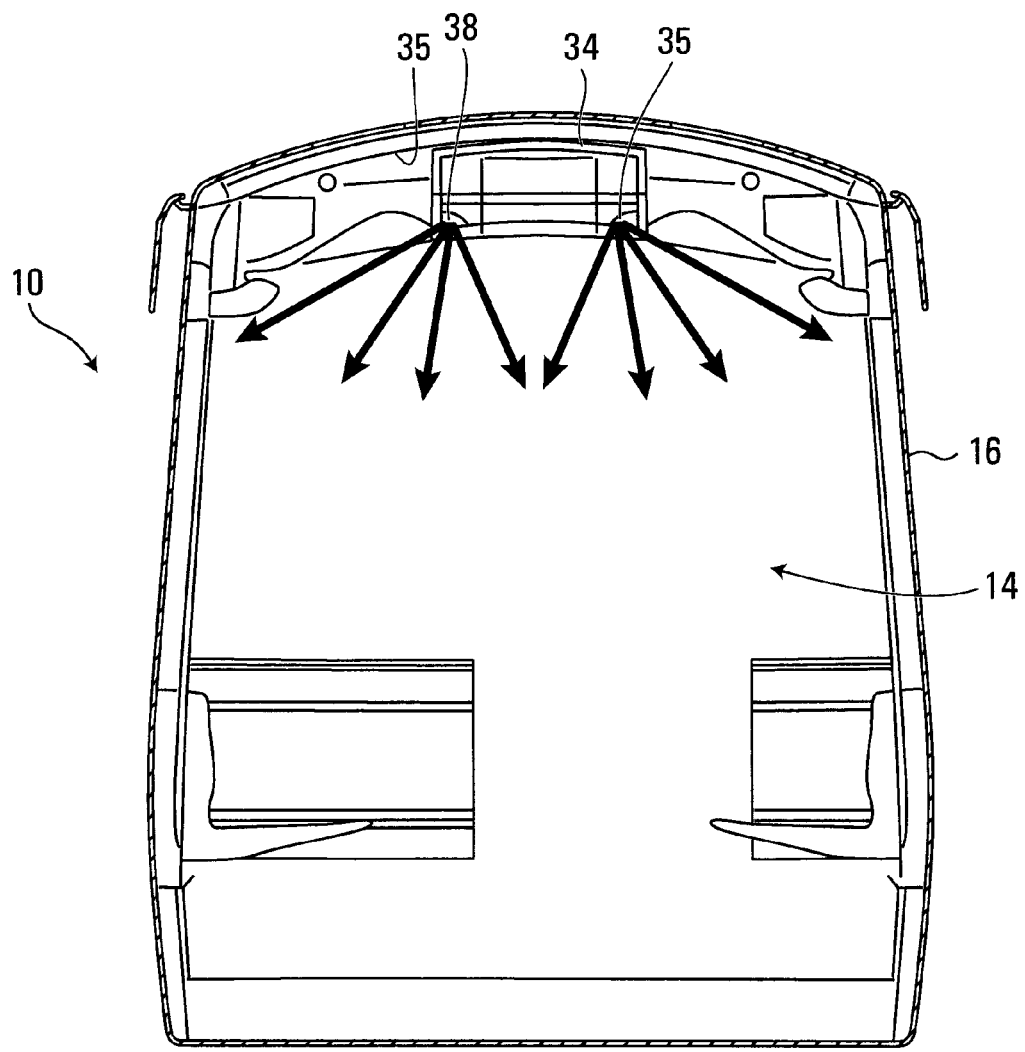
FIG. 6 shows a side cross-sectional view within the passenger transit vehicle of FIG. 1.
Figure 7:
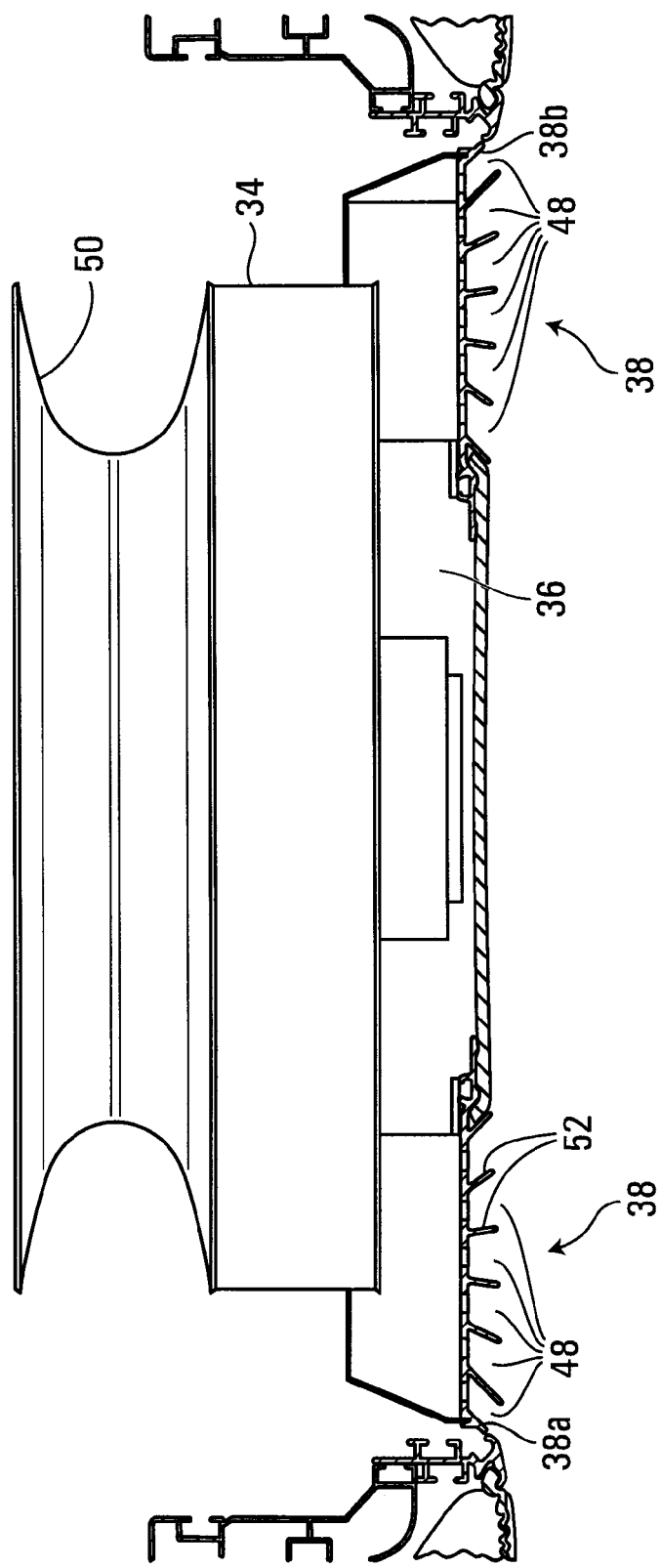
FIG. 7 shows a cross sectional view of the duct system of FIG. 5.

In the non-limiting embodiment shown in FIGS. 6 and 7, a first air diffuser 38a is positioned on a first side of the passenger transit vehicle 10 and a second air diffuser 38bis positioned on a second side of the passenger transit vehicle 10, such that the first and second air diffusers 38a, 38b run in parallel along the length of the passenger compartment 14. In a first non-limiting embodiment, each of the first and second air diffusers 38a, 38b run along substantially the entire length of the passenger compartment 14, such as between 90-100% of the length the passenger compartment 14. However, in an alternative embodiment, each of the first and second air diffusers 38a, 38b may comprise multiple air diffusers that are lined up end-to-end along the length of the passenger compartment. For example, the first air diffuser 38a may comprise four air diffusers that are each in fluid communication with a different one of the transfer ducts 36a, 36b, 36d and 36f, and the second air diffuser 38b may comprise four air diffusers that are each in fluid communication with a different one of the transfer ducts 36a, 36c, 36e and 36f. In such a case, there may be gaps between the ends of the air diffusers, such that the air diffusers 38a, 38b span less than 90% of the length of the passenger compartment 14.

As shown in FIG. 7, each of the air diffusers 38a, 38b comprises a plurality of air outlets 48 that are directed into the passenger compartment 14 for directing the outside air from the variable speed fan 34 downwards towards passengers that travel within the passenger transit vehicle 10. Each of the air outlets 48 may be defined by louvers 52 that project outwardly from the duct system 36 towards the passenger compartment 14. The louvers 52 extend longitudinally, parallel to the central longitudinal axis 26 of the passenger transit vehicle 10 such that the air outlets also extend longitudinally, parallel to the length of the passenger transit vehicle 10. The louvers 52 that define the air outlets 48 are each typically oriented within 45 degrees from an imaginary longitudinal plane that extends vertically from one end of the passenger compartment 14 to the other, or in such orientation as to ensure that the majority of passengers are exposed to the desired air flow speeds. As such, the air outlets 48 themselves are also oriented within 45 degrees from the imaginary longitudinal plane, such that air that exits through the air outlets 48 is directed linearly and angularly downwards towards an upper body of the passengers that travel within the passenger compartment 14.

In the non-limiting embodiment shown, each of the diffusers 38 comprises seven louvers 52 that define six air outlets 48. However, any number of louvers 52 and air outlets 48 could be included, while keeping within the scope of the present invention. Each air outlet 48 could be made of a linearly elongated opening, or of a plurality of small orifices. In a non-limiting embodiment, the seven louvers 52 of the diffusers 38a, 38b are positioned in a fanned-out arrangement with their central louver being oriented at approximately 0 degrees from the imaginary longitudinal plane, and the three louvers on either side of the central louver being positioned at increasing angles with respect to the imaginary longitudinal plane. In this manner, the air outlets 48 are able to direct air downwards over a fanned-out region of approximately 70 to 90 degrees. However, depending on the interior arrangement of the passenger vehicle, including the positioning of the passenger standing and seating areas, the louvers 52 may be oriented in multiple different configurations, all of which are included within the scope of the present invention. Given that there are two air diffusers 38a, 38b located within the upper region of the passenger transit vehicle 10, blowing air linearly downwardly in approximately a 70-90 degree fanned-out region, on both sides of the passenger transit vehicle 10, causes air flow to reach a majority of the passengers that travel within the passenger compartment 14.

In accordance with the present invention, the speed of the variable speed fan(s) 34 is controlled such that the outside air is provided into the passenger compartment at an air flow speed of greater than 0.15 m/s.

Exhaust System 40

As indicated above, outside air is drawn into the duct system 36 by the variable speed fans 34, and then enters the passenger compartment 14 through the air diffusers 38. In accordance with the present invention, the variable speed fans 34 are able to provide outside air to the passenger compartment 14 at an air flow rate of greater than 190 cfm per linear foot of passenger compartment. In order to avoid over pressurization within the passenger compartment 14 from the input of this outside air into the passenger compartment 14, the ventilation system 30 further comprises an exhaust system 40 for venting air from inside the passenger compartment 14 to outside the passenger transit vehicle 10. More specifically, the exhaust system 40 is operative for venting air at a rate substantially equivalent to the rate at which air is input into the passenger compartment 14.

Figure 8:
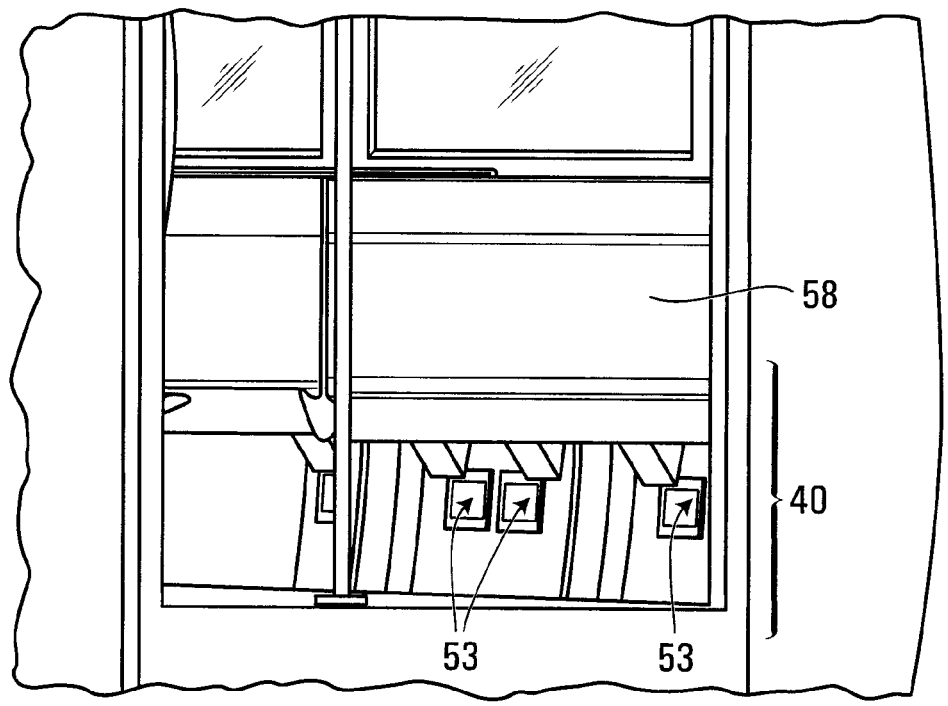
FIG. 8 shows a partial cut away view of a passenger compartment of the passenger transit vehicle of FIG. 1.
Figure 9:
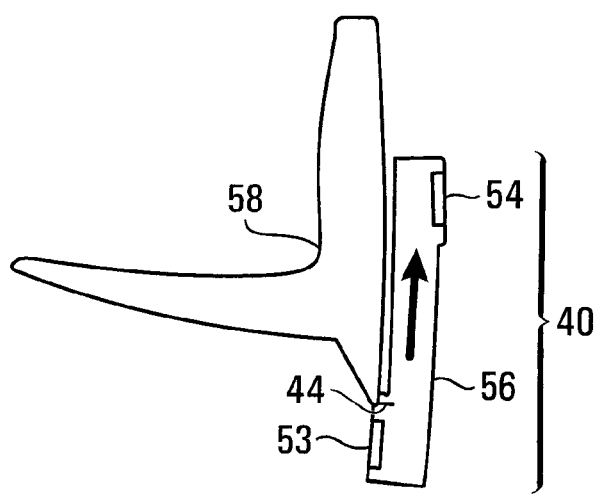
FIG. 9 shows a cross sectional view of an exhaust system of the ventilation system according to a non-limiting example of implementation of the present invention.

In accordance with the present invention, the exhaust system 40 is a passive system that comprises a plurality of internal vents 53, as shown in FIG. 8, located in a lower region of the passenger compartment 14. As shown in FIG. 9, these internal vents 53 are fluidly connected to a plurality of exterior vents 54 located on an outside surface of the passenger transit vehicle 10 via air transfer conduits 56. As such, air is able to flow from inside the passenger transit vehicle 10 to outside the passenger transit vehicle 10 through the air transfer conduits 56.

In the non-limiting example of implementation shown in FIG. 8, the internal air vents 53 are located in a lower wall portion of the passenger compartment 14. More specifically, the internal air vents 53 are located beneath the passenger seating 58 such that they are mostly out of view of the passengers that travel within the passenger transit vehicle 10. The internal air vents 53 could also be located in a lower wall portion, at a location slightly above the floor (such as 1-2 feet above the floor, for example). Other locations for the internal air vents 53 are also included within the scope of the present invention.

The external vents 54 may be located in a variety of different locations on the outside of the passenger transit vehicle 10 without departing from the present invention. Preferably, the external exhaust vents 54 are located on an exterior surface of the passenger transit vehicle below a lower edge of windows 24. In a first non-limiting example of implementation shown in FIG. 2, the external air vents 54 are located on the outside surface of the side walls 16 of the transit vehicle 10 at a region slightly below the windows 24. In an alternative non-limiting example of implementation (not shown), the external air vents 54 may be located below a cosmetic/maintenance panel on the outside surface of the transit vehicle 10 in a region in proximity to the floor of the transit vehicle 10. Other locations for the external air vents 54 are also included within the scope of the present invention, and the choice of location for the external air vents 54 will generally depend on factors such as security, noise, performance, aesthetic appearance and ease of maintenance.

The transfer conduits 56 that span between the internal air vents 53 and the external air vents 54 may be of any suitable material and construction so long as they facilitate the effective transfer of air from inside the passenger compartment 14 to outside the passenger transit vehicle 10 through the air vents 53 and 54.

Both the internal air vents 53 and the external air vents 54 can be of any suitable shape and size without departing from the spirit of the invention. In addition, the number of vents 53 and 54 can also vary depending on factors such as their shape and size and the rate of exhaust required for the transit vehicle 10.

Control Entity 42 and Temperature Sensor 44

Referring back to FIG. 3, in order to maintain passenger comfort within the transit vehicle 10, at least one control entity 42 is in communication with the variable speed fans 34 for controlling the speed of the variable speed fans 34 as a function of the ambient air temperature or in some cases, as a function of the combination of ambient air temperature and passenger load.

Variable Speed Fans 34 Controlled as a Function of Ambient Temperature

In the case where the speed of the variable speed fans 34 is controlled as a function of ambient air temperature, the speed of the variable speed fans 34 is caused to increase with increasing ambient air temperature. This increases the velocity of the air that exits the air diffusers 38 into the passenger compartment 14, which has been found to improve passenger comfort in hot temperatures.

As shown in FIG. 3, in addition to being in communication with the variable speed fans 34, the control entity 42 is also in communication with one or more temperature sensors 44 for obtaining temperature readings of the ambient air temperature. As indicated above, the ambient air temperature may be the ambient temperature within the passenger compartment 14 or the ambient temperature may be the ambient temperature outside the passenger vehicle 10. The control entity 42 is then able to control the speed at which the variable speed fans 34 operate at least in part on the basis of these temperature readings from the temperature sensors.

In a first non-limiting example, a single control entity 42 and a single temperature sensor 44 are included within the ventilation system 30 for controlling all of the variable speed fans 34 within the passenger compartment 14 of a passenger transit vehicle 10. However, in an alternative embodiment, multiple control entities 42 and multiple temperature sensors 44 could be included within the ventilation system 30 of the present invention. For example, the ventilation system 30 may comprise six control entities 42 and six temperature sensors 44, such that each control entity 42 and associated temperature sensor 44 is operative for controlling a respective one of the variable speed fan 34. Alternatively, the ventilation system 30 may comprise three control entities 42 each in communication with an associated temperature sensor 44 for controlling two of the variable speed fans 34. It should be appreciated that any combination of control entities 42, temperature sensors 44 and variable speed fans 34 is included within the present invention.

In the case where the ambient temperature used by the control entity 42 is the ambient temperature within the passenger compartment 14, the temperature sensors 44 are positioned within the transfer conduits 56 of the exhaust system 40, so as to be able to obtain a temperature reading of the ambient air that is leaving the passenger compartment 14. It should however, be appreciated that the temperature sensors 44 could be located anywhere within the passenger compartment 14, such as underneath the seats, among other possibilities. In the case where the ambient temperature used by the control entity 42 is the ambient temperature outside the passenger vehicle 10, the temperature sensors 44 may be located within the air intakes 32, within the plenum 42 or on an exterior surface of the passenger vehicle 10, among other possibilities.

Figure 11:
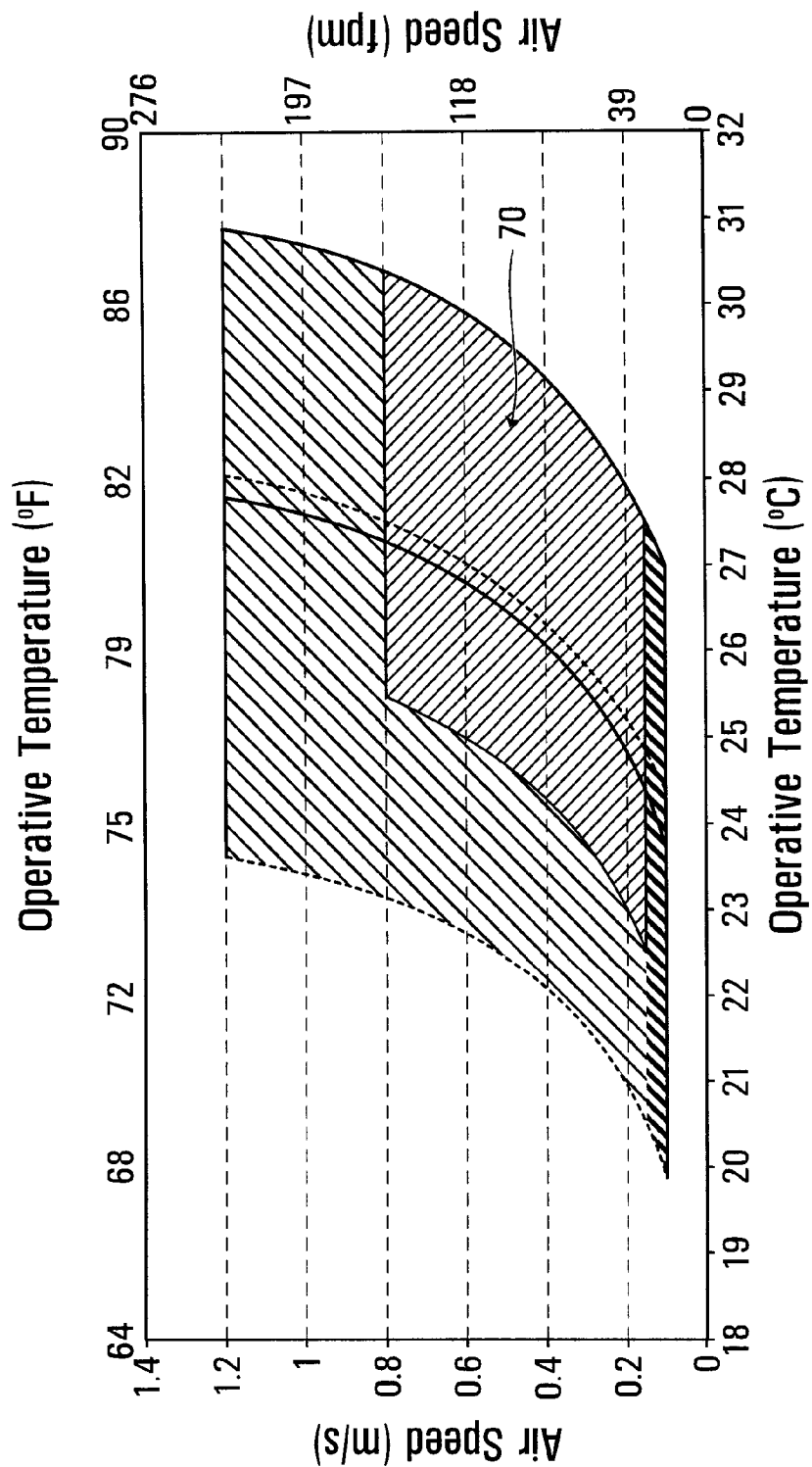
FIG. 11 shows an ASHRAE chart of "Operative Temperatures" to "Air Speeds" that shows a region that defines a range of air speeds that provides human comfort within a given range of ambient air temperatures.

As indicated above, the control entities 42 are in communication with the variable speed fans 34 for controlling the speed of the variable speed fans 34 as a function of the ambient air temperature. It has been found that there is a correlation between passenger comfort during hot temperatures and the speed of air that is being fanned into the passenger compartment 14. Shown in FIG. 11 is a chart from ANSI/ASHRAE 55-2010 (ref figure 5,2,3,2) that shows "Operative Temperatures" to "Air Speeds" that defines a range of air speeds that provides passenger comfort within a given range of ambient air temperatures (represented by region 70). As shown, for each temperature within the given ambient temperature range, there is a range of air speeds that provides passenger comfort for that temperature.

Within the given ambient temperature range, the control entity 42 is operative for controlling the speed of the variable speed fans 34 as a function of ambient temperature. The given ambient temperature range may be any suitable temperature range selected by the engineers and/or manufacturers of the ventilation system 30. For example, in the non-limiting embodiment shown in FIG. 10, the given ambient temperature range is between 22° C. and 31° C., although other temperature ranges could be used without departing from the present invention. In addition, in the graph shown, within this given ambient temperature range, the air speed produced by the variable speed fans 34 ranges between 0.15 m/s and 0.8 m/s. However, other air speed ranges are also within the scope of the present invention.

As indicated above, within the given ambient temperature range, the speed of the variable speed fans 34 is controlled as a function of the ambient temperature. More specifically, the speed of the variable speed fans 34 is controlled according to a function wherein the speed of air provided by the variable speed fans 34 increases with increasing ambient temperature.

In accordance with a first non-limiting example of implementation, the speed of the variable speed fans 34 may be controlled to produce an air speed that increases linearly and proportionally with increasing ambient air temperature. In the example shown in FIG. 10, the air speed produced by the variable speed fan would thus range between 0.15 m/s and 0.8 m/s linearly and proportionally to increasing temperature within the given ambient temperature range of 22° C. and 31° C.

Alternatively, other functions may be used. In accordance with a second non-limiting example of implementation, the speed of the variable speed fans 34 may be controlled to produce an air speed that increases exponentially or logarithmically with increasing ambient air temperature within the given ambient air temperature range. In yet further non-limiting example of implementation, the speed of the variable speed fans 34 may be controlled to produce an air speed that increases according to a step function with increasing ambient air temperature within the given ambient air temperature range. As such, it should be appreciated that any function that causes the air speed to increase with increasing temperature is included within the scope of the present invention.

While the speed of the variable speed fans is controlled as a function of the ambient air temperature within the given ambient air temperature range, outside the given ambient temperature range, such as below 22° C. and above 31° C., the speed of the variable speed fans may be controlled to produce a relatively constant air speed. For example, below 22° C., the variable speed fans 34 may be controlled to provide a constant air speed of somewhere between 0.15 and 0.2 m/s, and above 31° C., the variable speed fans 34 may be controlled to provide a constant air speed of somewhere between 0.8 and 0.85 m/s.

Variable Speed Fans 34 Controlled as a Function of Ambient Temperature and Passenger Load In the case where the speed of the variable speed fans 34 is controlled as a function of the combination of ambient air temperature and passenger load, the speed of the variable speed fans 34 is controlled such that the air speed that exits the diffusers 38 increases as one or both of the passenger load and ambient air temperature increases. As such, when the ambient temperature remains the same, but the passenger load increases, the speed of the variable speed fans 34 will increase. Likewise, when the passenger load remains the same, but the ambient temperature increases, the speed of the variable fans 34 will increase. If both the passenger load and the ambient temperature increase, the speed of the variable speed fans 34 will also increase.

In order to control the variable speed fans 34 on a basis of the combination of the passenger load and ambient temperature, then the control entity 42 will most likely be in communication with one or more temperature sensors 44 for obtaining temperature readings of the ambient air temperature, as well as one or more passenger load sensors 41 (or the vehicle control system) for obtaining information regarding the passenger load. As indicated above, the ambient air temperature may be the ambient temperature within the passenger compartment 14 or the ambient temperature may be the ambient temperature outside the passenger vehicle 10. On a basis of the readings from the sensors 44 and 41, the control entity 42 is then able to control the speed at which the variable speed fans 34 operate.

It has been found that there is a correlation between passenger comfort during hot temperatures and/or heavy passenger load, and the speed of air that is being fanned into the passenger compartment 14. Therefore, within a given ambient temperature range, the control entity 42 is operative for controlling the speed of the variable speed fans 34 as a function of ambient temperature and passenger load. The given ambient temperature range may be any suitable temperature range selected by the engineers and/or manufacturers of the ventilation system 30, such as the range previously provided above. In addition, within this given ambient temperature range, the air speed produced by the variable speed fans 34 may range between 0.15 m/s and 0.8 m/s. However, other air speed ranges are also possible within the scope of the present invention.

The function used by the control entity 42 in order to control the speed of the variable speed fans 34 as a function of a combination of ambient temperature and passenger load, can take on a variety of different formats. Any function wherein the speed of the variable speed fans 34 is increases with an increasing one of ambient temperature and passenger load may be used. For example, a linear relation may be used.

Figure 10:
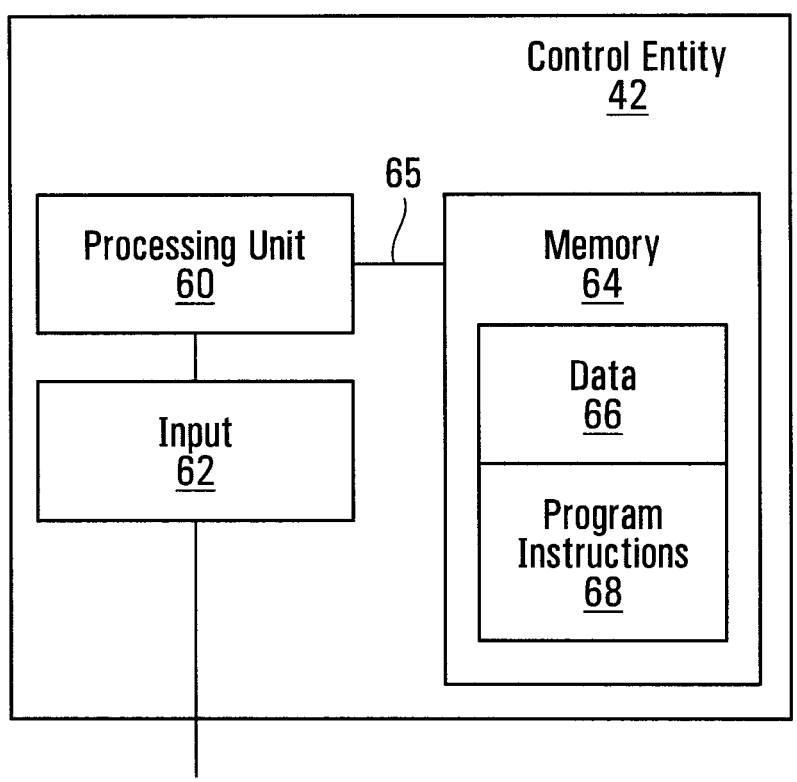
FIG. 10 shows a block diagram of a control entity of the ventilation system according to a non-limiting example of implementation of the present invention.

In accordance with a non-limiting example of implementation of the present invention, the control entity 42 may be configured as a computing unit including the components shown in FIG. 10. For example, the control entity 42 may include a processing unit 60 and a memory 64 connected by a communication bus 65. The memory 64 includes data 66 and program instructions 68. The processing unit 60 is adapted to process the data 66 and the program instructions 68 in order to implement the functionality of controlling the speed of the variable speed fans 34 as described above. For example, stored within the data 66 may be the specific function or algorithm used to determine the speed at which the variable speed fans 34 should be operating, depending on the ambient temperature within the passenger compartment 14. Stored within the program instructions 68 may be a program element, for execution by the processing unit 60, for causing the processing unit 60 to execute the function or algorithm stored within the data 66, and then issue a signal to the electric motor of the variable speed fans 34 for causing an adjustment in the speed of the variable speed fans 34.

The control entity 42 may also comprise a number of interfaces for receiving or sending data elements and/or signals to external devices. For example, input 62 is operative for receiving temperature measurements from the temperature sensor(s) 44. Although not shown in FIG. 10, the control entity 42 may further comprise an output for releasing a command signal to the electric motors of the variable speed fans 34 in order to be able to cause the variable speed fans 34 to operate at the desired speed. As indicated above, the processing unit 60 is operative for processing the received signal or signals from the temperature sensor(s) 44 to derive one or more command signals for causing the variable speed fans 34 to acquire the desired speed.

Alternatively, in some embodiments of the invention, all or part of the functionality for controlling the speed of the variable speed fans 34 as previously described herein with respect to the control entity 42, may be implemented as pre-programmed hardware or firmware elements (e.g., application specific integrated circuits (ASICs), electrically erasable programmable read-only memories (EEPROMs), etc.) or other related components.

The process performed by the control entity 42 will now be described in more detail with respect to the non-limiting flow diagram of FIG. 12. For the sake of simplicity, let us assume that this process begins when the variable speed fans 34 are operating at a steady speed that is appropriate for the ambient temperature within the passenger compartment 14.

At step 72, the control entity 42 receives a signal from the temperature sensor 44 indicative of a temperature measurement of the ambient air temperature within the passenger compartment 14 and/or a signal from the passenger load sensor 41, or a vehicle control system, indicative of the passenger load. These signals indicative of the temperature measurement or passenger load may be automatically transmitted to the control entity 42 at given time intervals (such as once every 30 seconds, or once every minute, for example). Alternatively, the temperature sensor 44 may only transmit a signal indicative of a temperature measurement of the ambient air temperature when the ambient temperature has changed by a given increment (such as when an increase or decrease of greater than 0.5° C. occurs, for example). Likewise, the passenger load sensor 41 or the vehicle control system may only transit a signal indicative of a passenger load when the load changes by a given amount. In yet a further example, at periodic time intervals, the processing unit 60 of the control entity 42 may query the temperature sensor 44 and possible the passenger load sensor 41 in order to get a reading of the ambient air temperature from the temperature sensor 44 and the passenger load from the passenger load sensor 41. In such a case, the sensors 41 and 44 only provide readings upon request from the control entity 42.

At step 74, once a signal indicative of the ambient air temperature or passenger load has been obtained, the processing unit 60 of the control entity 42 processes the signal or signals received in order to determine an appropriate speed for the variable speed fan(s) 34. This processing is done at least in part on a basis of the data 66 and program instructions 68 stored within the memory 64 of the control entity 42. For example, in the case where the determination is done on a basis of ambient temperature only, the determination of the appropriate speed may be done by applying the temperature reading of the ambient air temperature to a specific algorithm or equation. Alternatively, the determination may be done by performing a look-up operation within a table or graph. There are a variety of manners in which the processing unit 60 may determine an appropriate speed for the variable speed fan(s) 34 on a basis of the temperature measurement, all of which are included within the scope of the present invention.

At step 76, once an appropriate speed for the variable speed fan(s) 34 has been determined, the processing unit 60 generates a control signal and issues that control signal to the electric motor(s) of the variable speed fan(s) 34, for causing the variable speed fan(s) 34 to acquire the appropriate speed determined in step 74. Accordingly, the speed of the variable speed fan(s) 34 is controlled at least in part on a basis of the ambient air temperature and/or the passenger loading.

Figure 12:
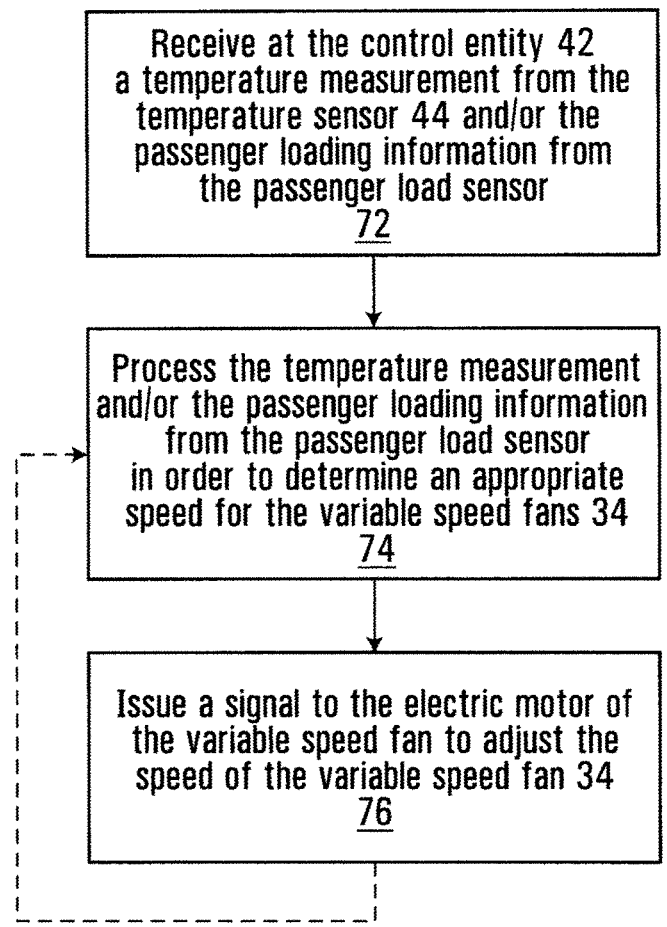
FIG. 12 shows a flow diagram of a non-limiting process executed by a control entity according to the present invention.

As shown by the dashed line in FIG. 12, there may be an optional feedback loop between steps 74 and 76, wherein the control entity 42 receives a signal from the motor of the variable speed fan(s) 34 indicative of the fan speed. As such, the control entity 42 can continuously ensure that the variable speed fan(s) 34 are operating at the correct fan speed, which was determined in step 74, and correct the fan speed, if necessary.

This process repeats itself so long as the ventilation system is in operation, such that the speed of the variable speed fan(s) 34 is adjusted whenever a change in ambient air temperature or possibly passenger load takes place.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. A ventilation system for a passenger transit vehicle, the passenger transit vehicle comprising a passenger compartment, the ventilation system comprising:
   a) a variable speed fan for drawing outside air from an air intake located on an exterior surface of the passenger transit vehicle and providing the outside air to the passenger compartment, the speed of the variable speed fan being controlled based at least in part on an ambient temperature and a passenger load, wherein within a given ambient temperature range, the speed of the variable speed fan is controlled such that the air speed produced by the variable speed fan increases with increasing ambient temperature or passenger load;
   b) an air diffuser positioned within an upper portion of the passenger compartment, the air diffuser comprising a plurality of air outlets directed into the passenger compartment for directing air from the variable speed fan towards passengers that travel within the transit vehicle;
   c) a duct system fluidly connecting the variable speed fan and the air diffuser, the duct system having a length and a cross sectional area, wherein the cross sectional area decreases along the length of the duct system for providing substantially constant air pressure along the length of the duct system, the air diffuser running substantially along the length of the duct system of decreasing cross sectional area, the length of the duct system of decreasing cross sectional area being positioned within the upper portion of the passenger compartment.

2. The ventilation system as defined in claim 1, wherein the air diffuser directs air towards the passengers at an air speed of at least 0.15 m/s.

3. The ventilation system as defined in claim 2, wherein the air diffuser directs air towards the passengers at an air speed of at least 0.4 m/s.

4. The ventilation system as defined in claim 3 wherein the air diffuser directs air towards the passengers at an air speed of at least 0.6 m/s.

5. The ventilation system as defined in claim 4, wherein the given ambient temperature range is between 22° C. and 31° C., and within the given ambient temperature range the speed of the variable speed fan is controlled such that the air diffuser provides an air speed of between 0.15 m/s and 0.8 m/s.

6. The ventilation system as defined in claim 5, wherein the speed of the variable speed fan is controlled such that the air diffuser provides an air speed that increases linearly between 0.15 m/s and 0.8 m/s as the ambient temperature increases from 22° C. and 31° C.

7. The ventilation system as defined in claim 1, wherein for a given ambient temperature below 22° C. the variable speed fan is caused to operate at a first constant fan speed and for a given ambient temperature above 31° C., the variable speed fan is caused to operate at a second constant fan speed.

8. The ventilation system as defined in claim 1, wherein the plurality of air outlets of the air diffuser are oriented within 45 degrees from a vertical axis in a longitudinal plane of the passenger compartment.

9. The ventilation system as defined in claim 1, further comprising at least one temperature sensor for obtaining a temperature measurement of the ambient temperature within the passenger compartment.

10. The ventilation system as defined in claim 9, further comprising a control entity in communication with the at least one temperature sensor and the variable speed fan, the control entity being operative for issuing control signals to the variable speed fan for controlling the speed of the variable speed fan at least in part on a basis of temperature measurements received from the temperature sensor.

11. The ventilation system as defined in claim 1, wherein the air intake located on the exterior surface of the passenger transit vehicle is in fluid communication with a pressure stabilization device for stabilizing the pressure of the outside air prior to the outside air being received by the variable speed fan.

12. The ventilation system as defined in claim 1, further comprising an exhaust system, the exhaust system being operative for venting air from the passenger compartment at a rate substantially equivalent to the rate at which air flow enters the passenger compartment from the air diffuser, so as to avoid over-pressurization of the passenger compartment, the exhaust system being located on a lower portion of the passenger compartment.

13. The ventilation system as defined in claim 12, wherein the exhaust system is a passive exhaust system.

14. The ventilation system as defined in claim 12, wherein the exhaust system comprises at least one internal exhaust vent located on an internal surface of the passenger compartment, at least one external exhaust vent located on an exterior surface of the passenger compartment and at least one transfer conduit for transferring air from the at least one internal exhaust vent to the at least one external exhaust vent, wherein the internal exhaust vent is located below a lower edge of windows contained within the passenger transit vehicle.

15. The ventilation system as defined in claim 14, wherein the ambient temperature is measured within the transfer conduit.

16. The ventilation system as defined in claim 1, wherein the speed of the variable speed fan is controlled at least in part as a function of ambient temperature within the passenger compartment.

17. A passenger transit vehicle having the ventilation system as defined in claim 1, wherein the air diffuser is one of a plurality of air diffusers, the plurality of air diffusers being located at spaced intervals along a length of the passenger compartment.

18. The passenger transit vehicle as defined in claim 17, wherein the plurality of air diffusers extend along at least 85 percent of a length of the passenger compartment.

19. A passenger transit vehicle having the ventilation system as defined in claim 1, wherein the variable speed fan is one of a plurality of variable speed fans for providing outside air to the passenger compartment.

20. The passenger transit vehicle having the ventilation system as defined in claim 19, wherein a control entity is in communication with the plurality of variable speed fans for controlling the speed of each of the plurality of variable speed fans at least in part on a basis of the ambient temperature.

21. A ventilation system for a passenger transit vehicle, the passenger transit vehicle comprising a passenger compartment, the ventilation system comprising:
  a) a variable speed fan for drawing outside air from an air intake located on an exterior surface of the passenger transit vehicle and providing the outside air to the passenger compartment, the speed of the variable speed fan being controlled based at least partially on an ambient temperature and a passenger load;
  b) an air diffuser positioned within an upper portion of the passenger compartment, the air diffuser comprising a plurality of air outlets directed into the passenger compartment for directing air from the variable speed fan towards passengers that travel within the transit vehicle, wherein within a given ambient temperature range, the speed of the variable speed fan is controlled such that the air speed exiting the air diffuser increases with at least one of increasing ambient temperature and increasing passenger load;
  a duct system fluidly connecting the variable speed fan and the air diffuser, the duct system having a length and a cross sectional area, wherein the cross sectional area decreases along the length of the duct system for providing substantially constant air pressure along the length of the duct system, the air diffuser running substantially along the length of the duct system of decreasing cross sectional area, the length of the duct system of decreasing cross sectional area being positioned within the upper portion of the passenger compartment.

22. The ventilation system as defined in claim 1, wherein the air diffuser and the variable speed fan connected by the duct system form a ventilation unit, the ventilation unit being one of a plurality of ventilation units forming part of an air input system, each ventilation unit in the plurality of ventilation units having a respective variable speed fan connected to a respective air diffuser.

23. The ventilation system as defined in claim 22, wherein the air input system is operative for providing outside air into the passenger compartment at an air flow speed of greater than 0.15 m/s.

24. The ventilation system as defined in claim 23, further comprising:
  a) an exhaust system for venting air from the passenger compartment at a rate at least equivalent to the rate at which the air input system provides air flow into the passenger compartment; and
  b) a control entity, the control entity being operative to control a speed of variable speed fans of the ventilation units at least in part as a function of ambient temperature, wherein within a given ambient temperature range, the speed of the variable speed fan is controlled such that the air speed produced by the variable speed fans of the ventilation units increases with increasing ambient temperature.

25. The ventilation system as defined in claim 24, wherein the exhaust system is a passive exhaust system.

26. The ventilation system as defined in claim 24, wherein the exhaust system comprises at least one internal exhaust vent located on an internal surface of the passenger compartment, at least one external exhaust vent located on an external surface of the passenger compartment and at least one transfer conduit for transferring air from the at least one internal exhaust vent to the at least one external exhaust vent, wherein the internal exhaust vent is located below a lower edge of windows contained within the passenger transit vehicle.

27. The ventilation system as defined in claim 26, wherein the ambient temperature is measured within the transfer conduit.

28. The ventilation system as defined in claim 22, wherein air diffusers of the plurality of ventilation units extend along at least 85 percent of a length of the passenger compartment.

29. The ventilation as system defined in claim 22, wherein the air input system is operative for providing outside air into the passenger compartment at an air flow rate of greater than 190 cfm per linear foot of passenger compartment.

30. The ventilation system as defined in claim 22, wherein the air input system is operative for providing outside air into the passenger compartment at an air flow speed of greater than 0.40 m/s.

31. The ventilation system as defined in claim 30, wherein the air input system is operative for providing outside air into the passenger compartment at an air flow speed of greater than 0.60 m/s.

32. The ventilation system as defined in claim 21, wherein the speed of the variable speed fan is controlled at least in part by a control entity configured to approximate the passenger load.

33. The ventilation system as defined in claim 32, wherein the control entity approximates the passenger load based at least partially on data received from a passenger load sensor.

34. The ventilation system as defined in claim 33, wherein the passenger load sensor comprises a weight sensor.

35. The ventilation system as defined in claim 32, wherein the control entity approximates the passenger load based at least partially on historical data.

36. The ventilation system as defined in claim 32, wherein the control entity is configured to communicate with an automated transit pass system, and wherein the control entity approximates the passenger load based at least partially on data received from the automated transit pass system.

* * * * *